United States Patent
Rolland et al.

(10) Patent No.: US 10,088,681 B2
(45) Date of Patent: Oct. 2, 2018

(54) OPTICAL DISPLAY APPARATUS, METHOD, AND APPLICATIONS

(71) Applicant: University of Rochester, Rochester, NY (US)

(72) Inventors: Jannick P. Rolland, Pittsford, NY (US); Aaron Bauer, Rochester, NY (US)

(73) Assignee: University of Rochester, Rochester, NY (US)

( * ) Notice: Subject to any disclaimer, the term of this patent is extended or adjusted under 35 U.S.C. 154(b) by 90 days.

(21) Appl. No.: 14/891,208

(22) PCT Filed: May 9, 2014

(86) PCT No.: PCT/US2014/037494
§ 371 (c)(1),
(2) Date: Nov. 13, 2015

(87) PCT Pub. No.: WO2014/189692
PCT Pub. Date: Nov. 27, 2014

(65) Prior Publication Data
US 2016/0091723 A1    Mar. 31, 2016

Related U.S. Application Data

(60) Provisional application No. 61/827,033, filed on May 24, 2013.

(51) Int. Cl.
*G02B 27/14* (2006.01)
*G02B 27/01* (2006.01)
(Continued)

(52) U.S. Cl.
CPC ............ *G02B 27/0172* (2013.01); *G02B 5/23* (2013.01); *G02B 17/0816* (2013.01);
(Continued)

(58) Field of Classification Search
CPC . G02B 27/01; G02B 27/0176; G02B 27/0179
(Continued)

(56) References Cited

U.S. PATENT DOCUMENTS 5,035,474 A * 7/1991 Moss ................... G02B 27/01
359/13
5,408,346 A * 4/1995 Trissel ................ G02B 5/3016
349/115
(Continued)

FOREIGN PATENT DOCUMENTS

| EP | 0802440 A2 | 10/1997 |
| JP | 3715686 B2 | 11/2005 |
| WO | 2012088478 A1 | 6/2012 |

OTHER PUBLICATIONS

International Search Report and Written Opinion of the International Searching Authority in corresponding International Application No. PCT/US2014/037494, completed Dec. 14, 2014 (10 pages).
(Continued)

*Primary Examiner* — Stephone B Allen
*Assistant Examiner* — Travis Fissel
(74) *Attorney, Agent, or Firm* — Andrew J. Anderson, Esq.; Harter Secrest & Emery LLP

(57) ABSTRACT

A see-through optical display apparatus includes an image generating component, a tilted primary mirror having a non-flat, freeform, front optical surface, and a tilted secondary mirror having a non-flat, freeform, front optical surface, wherein the apparatus has an external pupil. A method for designing/making a see-through optical display apparatus for displaying an image generated by or on an image generating component of the apparatus.

16 Claims, 16 Drawing Sheets

(51) Int. Cl.
   *G02B 17/08* (2006.01)
   *G02B 5/23* (2006.01)
   *G02B 27/00* (2006.01)
(52) U.S. Cl.
   CPC ..... *G02B 27/0012* (2013.01); *G02B 27/0176* (2013.01); *G02B 2027/011* (2013.01); *G02B 2027/013* (2013.01); *G02B 2027/015* (2013.01); *G02B 2027/0178* (2013.01)
(58) Field of Classification Search
   USPC ......... 359/13, 14, 629–633; 345/9; 348/115; 349/11
   See application file for complete search history.

(56) References Cited

U.S. PATENT DOCUMENTS

| | | | | |
|---|---|---|---|---|
| 5,467,205 A * | 11/1995 | Kuba | G02B 27/017 | 348/E13.04 |
| 5,726,670 A * | 3/1998 | Tabata | G02B 27/017 | 345/7 |
| 5,751,493 A * | 5/1998 | Hur | G02B 27/017 | 348/E13.022 |
| 5,754,334 A * | 5/1998 | Artiglia | G02F 2/004 | 359/326 |
| 5,790,311 A * | 8/1998 | Togino | G02B 17/0848 | 359/361 |
| 5,808,802 A * | 9/1998 | Hur | G02B 27/017 | 348/E13.022 |
| 5,815,741 A * | 9/1998 | Okuyama | G02B 27/0093 | 250/221 |
| 6,356,393 B1 * | 3/2002 | Potin | G02B 27/0172 | 250/494.1 |
| 6,480,337 B2 * | 11/2002 | Inoguchi | G03B 21/10 | 359/630 |
| 6,518,939 B1 * | 2/2003 | Kikuchi | G06F 3/147 | 345/7 |
| 6,529,330 B1 * | 3/2003 | Sekita | G02B 13/04 | 359/630 |
| 6,731,434 B1 | 5/2004 | Hong et al. | | |
| 7,226,167 B2 | 6/2007 | Cobb | | |
| 8,616,712 B2 | 12/2013 | Rolland et al. | | |
| 2002/0030636 A1 * | 3/2002 | Richards | G02B 27/017 | 345/8 |
| 2006/0232853 A1 * | 10/2006 | Dobschal | G02B 17/0615 | 359/366 |
| 2006/0268421 A1 * | 11/2006 | Shimizu | G02B 5/32 | 359/630 |
| 2010/0045933 A1 * | 2/2010 | Eberl | A61B 3/113 | 351/210 |
| 2010/0284070 A1 * | 11/2010 | Shimizu | G02B 5/32 | 359/485.01 |
| 2011/0181855 A1 * | 7/2011 | Bittner | G03F 7/70266 | 355/55 |
| 2012/0081800 A1 * | 4/2012 | Cheng | G03B 21/00 | 359/720 |
| 2012/0229367 A1 * | 9/2012 | Magyari | G02B 27/0172 | 345/8 |
| 2012/0235900 A1 * | 9/2012 | Border | G02B 5/23 | 345/156 |
| 2012/0243114 A1 * | 9/2012 | Rolland | G01M 11/005 | 359/858 |
| 2012/0300978 A1 * | 11/2012 | Eberl | A61B 3/113 | 382/103 |
| 2013/0063754 A1 * | 3/2013 | Saisho | G02B 26/0858 | 358/1.13 |
| 2013/0135181 A1 * | 5/2013 | Eberl | A61B 3/113 | 345/8 |
| 2013/0141527 A1 * | 6/2013 | Shimizu | G02B 5/32 | 348/40 |
| 2013/0194674 A1 * | 8/2013 | Horiuchi | G02B 27/0101 | 359/631 |

OTHER PUBLICATIONS

Bauer et al.: Visual space assessment of two all-reflective, freeform, optical see-through head-worn displays © 2014 Optical Society of America (9 pages).
Azuma: "Augmented Reality: Approaches and Technical Challenges," Fundamentals of Wearable Computers and Augumented Reality L. Erlbaum Associates Inc., 2000 (pp. 27-63).
Cakmakci et al.: "Head-Worn Displays: A Review," J. Display Technol. 2, 199-216 (2006).
Rolland et al.: "See-Through Head Worn Display (HWD) Architectures," Handbook of Visual Display Technology, Springer Berlin Heidelberg, 2012, pp. 2145-2170.
Cakmakci et al.: "Examples of HWD Architectures: Low-, Mid- and Wide-Field of View Designs," Handbook of Visual Display Technology, Springer Berlin Heidelberg, 2012, pp. 2195-2211.
Plummer: "Unusual optics of the Polaroid SX-70 Land camera," Appl. Opt. 21, 196-208 (1982).
Takagi et al.: "Development of a stereo video see-through HMD for AR systems," Proceedings of IEEE and ACM International Symposium on Augmented Reality, (2000) 68-77.
Cakmakci et al.: "Design and fabrication of a dual-element off-axis near-eye optical magnifier," Opt. Lett. 32, 1363-1365 (2007).
Cheng et al.: "Design of an optical see-through head-mounted display with a low f-number and large field of view using a freeform prism," Appl. Opt. 48, 2655-2668 (2009).
Fuerschbach et al.: "A new family of optical systems employing φ-polynomial surfaces," Opt. Express 19, 21919-21928 (2011).
Cakmakci et al.: "Optimal local shape description for rotationally non-symmetric optical surface design and analysis," Opt. Express 16, 1583-1589 (2008).
Shack et al.: "Influence of Alignment Errors of a Telescope System on Its Aberration Field," Proc SPIE 0251, 146-153 (1980).
Thompson: "Description of the third-order optical aberrations of near-circular pupil optical systems without symmetry," J. Opt. Soc. Am. A22, 1389-1401 (2005).
Ha et al.: "Optical Assessment of Head-Mounted Displays in Visual Space," Applied Optics 41, 5282-5289 (2002).
Smith: "Modern Optical Engineering," 3rd Ed. McGraw-Hill, New York (2000), Chapter 17, pp. 457-458.
Born et al.: "Principles of optics: electromagnetic theory of propagation, interference and diffraction of light," CUP Archive (1999), pp. 135-141.
Rash: "Helmet mounted displays: Design issues for rotary-wing aircraft," SPIE Press, (1999).
Bauer et al.: "Computational optical distortion correction using a radial basis function-based mapping method," Opt. Express 20, 14906-14920 (2012).
Walker: "Optical Design for Visual Systems," SPIE Press (2000), Chapter 2, pp. 3-13.
Rolland et al.: "Optical versus video see-through head-mounted displays in medical visualization," Presence 9, 287-309 (2000).
Smilie et al.: "Design and characterization of an infrared Alvarez lens," Optical Engineering 51, 0313006-013001-013005-013008 (2012).
European Search Report in corresponding EP Application No. 14801768.4 dated Apr. 22, 2016 (7 pages).

* cited by examiner

OPTICAL DISPLAY APPARATUS, METHOD, AND APPLICATIONS

RELATED APPLICATION DATA

This application is a § 371 national stage application of International Application No. PCT/US2014/037494 filed May 9, 2014, which claims the benefit of U.S. provisional application Ser. No. 61/827,033 filed May 24, 2013, the subject matter of which is incorporated herein by reference in its entirety.

STATEMENT OF GOVERNMENT INTEREST

This invention was made with government support under grant number 1002179 awarded by the National Science Foundation. The U.S. Government has certain rights in the invention.

BACKGROUND

Aspects and embodiments of the invention are most generally directed to optical systems/apparatus and methods for designing and/or making said optical systems/apparatus. More particularly, aspects and embodiments of the invention are directed to a see-through optical display apparatus and method for designing and/or making said see-through optical display apparatus.

Wearable displays, such as head-worn displays (HWDs), represent the newest entry into the ever-evolving augmented reality market. Packaging constraints for HWDs align with the constraints of other devices that are worn on one's head. This necessitates such devices to be lightweight and compact, meaning using a minimum number of optical elements and employing unique packaging geometries. The problem remains that when the number of optical elements is reduced and non-rotationally symmetric geometries are used, the resulting optical aberrations are too great to correct with rotationally symmetric optical surfaces. Because the design problem of HWDs is so highly constrained (element count, geometry), the surface shapes play an extremely important role.

When starting an optical design, there are three critical parameters that need to be well-defined: the operational waveband, the aperture stop size, and the field of view. The waveband is important because it dictates the materials one can use, and, for a visual system that requires an external aperture stop, lateral chromatic aberrations are often the limiting aberrations of the system. The remaining two parameters often fight against one another according to the Lagrange invariant, where a given value for the Lagrange invariant reflects the overall complexity of the design. A large aperture stop requires a smaller FOV, and vice-versa.

A disadvantage of rotationally symmetric reflective systems is that they are obscured, which decreases the total intensity of light and introduces diffraction effects at the image plane. Designers can use a variety of strategies to make reflective systems unobscured: 1) the aperture stop can be offset from the mechanical axis, 2) the FOV can be biased, meaning a portion of the off-axis fields are considered the active fields for the system, 3) a combination of 1) and 2), or 4) the surfaces themselves can be tilted. For systems with rotationally symmetric surfaces, the latter most method is typically avoided because tilting powered surfaces results in optical aberrations such as field-constant astigmatism and coma that may not be balanced using rotationally symmetric surfaces.

Another packaging constraint for HWDs is the requirement that they fit around the facial structures near the eye. The distance from the entrance pupil of the optical design, which will be coincident with the entrance pupil of the eye, to the closest design feature (i.e., optical element, detector, microdisplay, etc.) must be great enough to clear the brows, nose, and/or cheek bones.

The inventors have recognized the benefits and advantages to be realized by a see-through optical display apparatus that addresses the aforementioned disadvantages and shortcomings, the especial benefits and advantages of such a see-through optical display apparatus in the form of a head worn display, a detailed and efficient method for designing and making such see-through optical display apparatus and HWDs, and techniques for analyzing the performance of such see-through optical display apparatus and HWDs. These benefits and advantages are realized by the embodied invention as described herein below with reference to the figures and in the appended claims.

Definitions of Certain Terms as Used Herein

The term 'freeform' optical surface refers to an optical surface without rotational symmetry, and as that term is well understood in the art, including but not limited to, e.g., XY polynomials, φ-polynomial such as Zernike polynomials and other orthogonal sets (such as disclosed in U.S. Pat. No. 8,616,712, the subject matter of which is incorporated herein by reference in its entirety), radial basis functions, and hybrid descriptions combining, for example, φ-polynomial and radial basis functions.

The term 'external pupil' refers to the system aperture stop not being located at, on, within or between any optical surface(s) of the optical system.

The term 'see-through' optical display means that the apparatus offers an unobstructed view of the surrounding environment, while overlaying a magnified image generated by an image-generating component of the apparatus.

The term 'adding a coma (or) an astigmatism (or) a spherical aberration term to a surface' means that the shape of the surface is changed to be characteristic of either coma, astigmatism, or spherical aberration, respectively.

The term 'field of view' (FOV) means to what angular extent the optical system can 'see' into and has the format (X FOV)×(Y FOV), where (X FOV) is the half field of view in the X-direction and (Y FOV) is the half field of view in the Y-direction.

The term 'eyebox' means the volume where the pupil of the eye (iris) will go, which is roughly three millimeters (mm) behind the cornea. The entrance pupil to the human eye varies in diameter depending on the relative brightness of the environment. In a well-lighted room it is roughly three mm in diameter, thus the optical system advantageously has an eyebox of at least three mm in diameter. When the eyebox is larger than three mm, it has the added benefit of allowing for slight decenters of the eye with respect to the optical system. Also, the eye will naturally scan the environment, so a larger eyebox allows the viewer to accommodate this natural swivel of the eye without losing any light from a head worn display (HWD).

The term 'effective focal length' (EFL) means that if collimated light enters the optical system, the EFL will tell you where the light will focus with respect to the rear principal plane. The value is chosen based on the size of the image source and the desired FOV using the relations EFL=(half the diagonal of the image source)/(half of the FOV).

The term 'about' means the amount of the specified quantity plus/minus a fractional amount (e.g., ±10%, +9%, +8%, +7%, +6%, +5%, +4%, +3%, +2%, +1%, etc.) thereof that a person skilled in the art would recognize as typical and reasonable for that particular quantity or measurement.

The term 'substantially' means as close to or similar to the specified term being modified as a person skilled in the art would recognize as typical and reasonable; for e.g., within typical manufacturing and/or assembly tolerances, as opposed to being intentionally different by design and implementation.

SUMMARY

The most general aspects and embodiments of the invention are a see-through optical display apparatus and method for designing and/or making such a see-through optical display apparatus.

More particularly, aspects and embodiments provide an optical display system, design and fabrication methods for the optical display system, and applications of use of the optical display system. An exemplary, non-limiting embodiment of the optical display system is an all reflective, freeform, optical see-through, head-worn display (HWD) apparatus.

An aspect of the invention is a see-through optical display apparatus. The apparatus includes an image generating component, a tilted primary mirror having a non-flat, freeform, front optical surface, and a tilted secondary mirror having a non-flat, freeform, front optical surface, wherein the apparatus has an external pupil. According to various exemplary, non-limiting embodiments, the apparatus may include the following additional features, limitations, and/or characteristics:

wherein the external pupil is an aperture stop located at the entrance pupil of an observer viewing the image;

wherein the image generating component is an OLED microdisplay;

wherein the front surfaces of the primary mirror and the secondary mirror have concave curvatures;

wherein at least one of the mirrors' surfaces has a photochromic or an electrochromic coating;

further comprising a flat surface, semi-transparent/semi-reflective optical component;

characterized by a volumetric footprint having a diameter that is equal to or less than 32.5 millimeters (mm);

characterized by a volumetric footprint having a radius that is equal to or less than 14 millimeters (mm);

characterized by a field of view (FOV) between 20-30 degrees;

further comprising an eyeglass frame to which the image generating component, the primary mirror, and the secondary mirror are coupled;

further comprising a head-wearable structure to which the image generating component, the primary mirror, and the secondary mirror are coupled;

wherein the apparatus consists of the image generating component, the primary mirror having a non-flat, freeform, front optical surface, and the secondary mirror having a non-flat, freeform, front optical surface, wherein the primary mirror is a semi-transparent/semi-reflective optical component;

wherein the front surfaces of the primary mirror and the secondary mirror have concave curvatures;

wherein at least one of the mirrors' surfaces has a photochromic or an electrochromic coating;

wherein the primary mirror has a non-flat, freeform, rear optical surface;

wherein the apparatus consists of the image generating component, the primary mirror having a non-flat, freeform, front optical surface, the secondary mirror having a non-flat, freeform, front optical surface, and a flat surface, semi-transparent/semi-reflective optical component;

wherein the front surfaces of the primary mirror and the secondary mirror have concave curvatures;

wherein at least one of the mirrors' surfaces has a photochromic or an electrochromic coating.

A method for designing/making a see-through optical display apparatus for displaying an image generated by or on an image generating component of the apparatus. The method includes the steps of: a) determining an apparatus specification; b) selecting a field of view and an aperture stop size for the apparatus; c) positioning the aperture stop at an entrance pupil of an observing optical system; d) designing a rotationally symmetric, spherical optical system; e) determining an aberration content of the apparatus over the full field of view; f) identifying a dominant aberration comprising one of coma and astigmatism, and i) if coma: determining whether the coma is more field constant or more field dependent, and if more field constant: adding a coma term to the optical surface nearest to the aperture stop, or if more field dependent: adding a spherical aberration term to the optical surface furthest from the aperture stop; or ii) if astigmatism: determining whether the astigmatism is more field constant or more field dependent, and if more field constant: adding an astigmatism term to the optical surface nearest to the aperture stop, or if more field dependent: adding a coma term to the optical surface furthest from the aperture stop; g) optimizing the optical system design; h) determining whether the aberration content of the optimized design decreased, and iii) if no: determining whether the apparatus meets the determined specification, and if yes: design is complete, or if no: determining whether the limiting aberration is more field constant or more field dependent, and if more field constant: adding the next higher-order aberration term to the surface nearest to the aperture stop, or if more field dependent: adding the next higher-order aberration term to the surface furthest from the aperture stop; i) repeating steps (g) through (h); or iv) if yes: repeating steps (e) through (h).

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

DETAILED DESCRIPTION

The above mentioned benefits and advantages are obtained and enabled by a see-through optical display apparatus that uses tilted, all reflective and semi-reflective/semi-transmissive components having freeform optical surfaces. The embodied design strategy involved first choosing the pupil size so that it corresponds with that of a human eye and then maximizing the FOV.

Because the design problem is so highly constrained (element count, geometry), the surface shape plays an extremely important role. Some mathematical descriptions of these surfaces include: XY polynomials, φ-polynomial such as Zernike polynomials and other orthogonal sets, radial basis functions, and hybrid descriptions combining for example φ-polynomial and radial basis functions. Zernike polynomials were used in the instant invention because of their close relationship with the wavefront expansion aberrations and the optical design leverage provided by nodal aberration theory.

Two classes of a see-through optical display apparatus will be discussed: a two-mirror design 100-1 and a three-mirror design 100-2.

Figure 1:
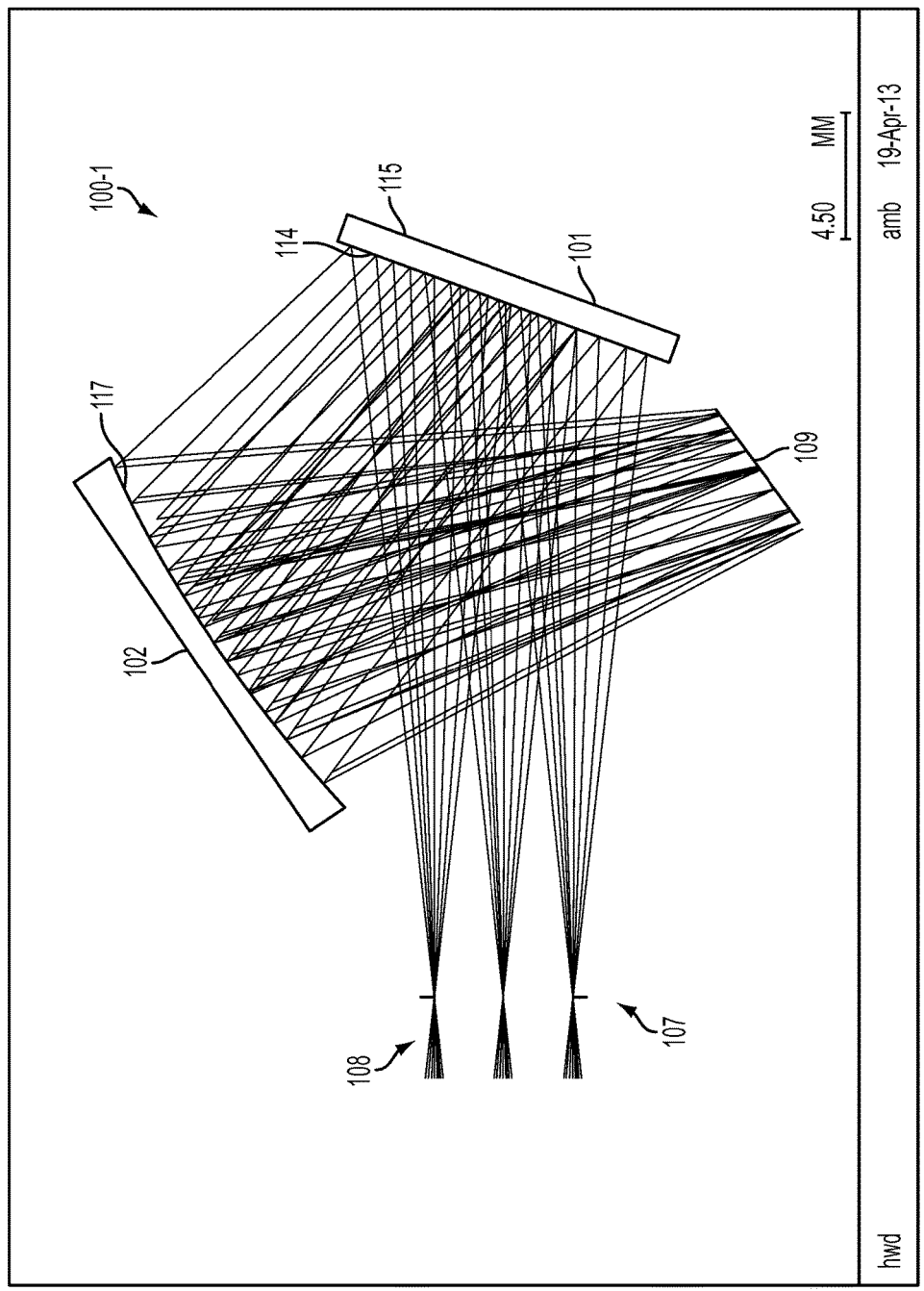
FIG. 1 shows a two-dimensional ray trace of a two-mirror see-through optical display apparatus/system according to an illustrative embodiment of the invention.
Figure 4:
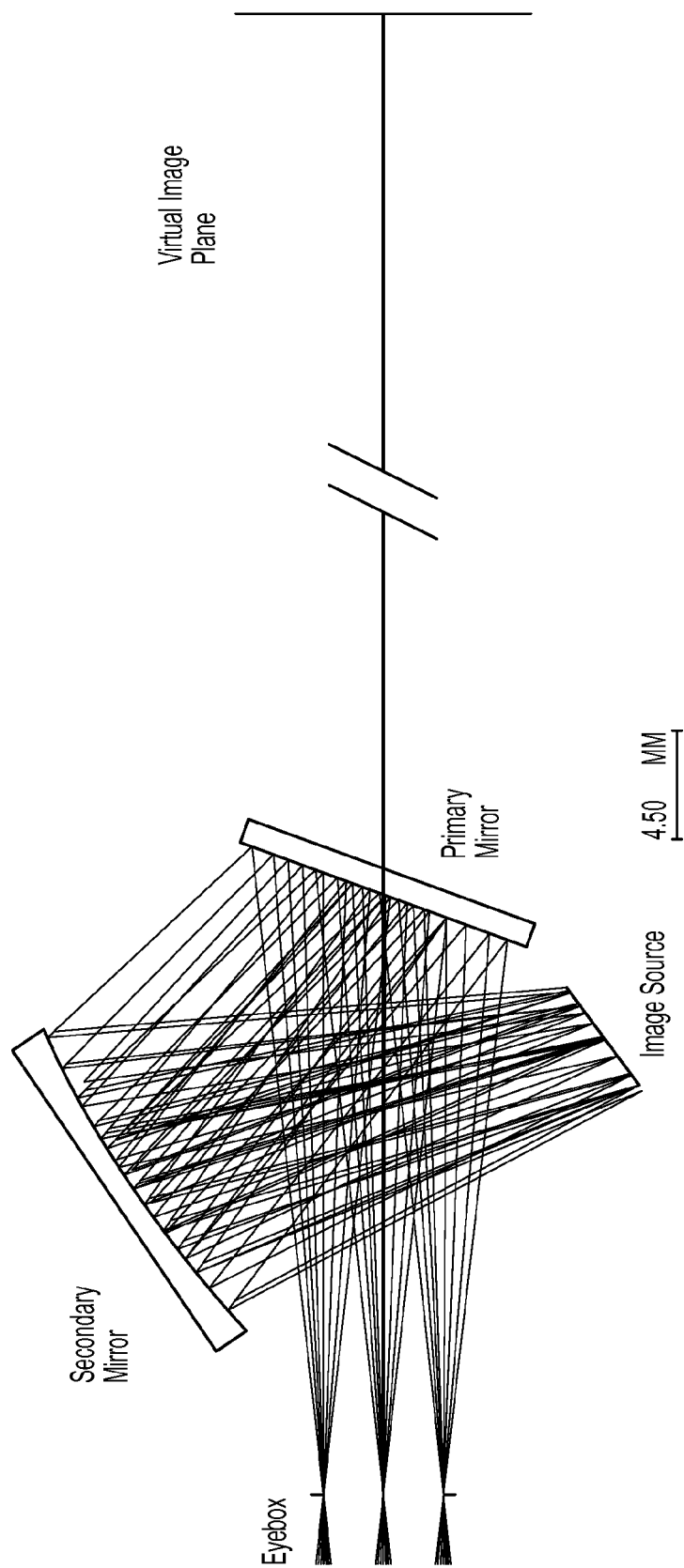
FIG. 4 shows the two-dimensional ray trace of the two-mirror see-through optical display apparatus/system of FIG. 1, but with the addition of the virtual image plane located ~10 meters in front of the system, at a location at which the eye can focus, according to an illustrative aspect of the invention.

FIG. 1 shows a two-dimensional ray trace of a two-mirror see-through optical display apparatus/system 100-1 consisting of a concave primary mirror 101, a concave secondary mirror 102, and an image generating component 109, and having an external aperture stop 107 located at the eyebox 108; i.e., where the pupil of the eye will be placed. The primary mirror 101 is comprised of a transparent material coated on the concave front surface (left side, closest to eyebox) 114 with a partially reflective coating (80% Reflective/20% Transmissive, up to 50% R/50% T). Additionally, the use of photochromic or electrochromic coatings will allow the user to darken the real scene in full sunlight to maintain sufficient contrast of the superimposed virtual image. Both the front surface 114 and the rear surface 115 of this element are freeform, or non-rotationally symmetric. Since the system is a 'see-through' display (meaning that it offers an unobstructed view of the surrounding environment, while overlaying a magnified image of the microdisplay), viewing the environment through the freeform front surface without compensating optics would result in a very aberrated and, ultimately, unusable system. Therefore, the rear surface of the mirror was also made freeform. As such, its mathematical description must contain the same number of Zernike terms as the front surface, due to orthogonality of aberrations. FRINGE Zernike terms 1, 3, 5, 8, 9, 11, 12 were used in the optimization of the rear side. To assess the performance of the see-through system, the MTF was evaluated at the human visual limit (1 cycle/arcmin) and provided near diffraction-limited performance; the distortion was negligible. The secondary mirror 102 has a 100% reflective freeform front surface 117. The image generating component 109 (envisioned, e.g., as a small TV or computer monitor) is what a user is looking at when he/she uses the optical system; however, the user sees the generated image through the optics of the image generating component but does not see the microdisplay directly. Examples of what could be placed here are: OLED microdisplays, MEMS scanning mirror, LCoS microdisplay, etc. In this and other figures, the exemplary image generating component 109 was a color OLED (MICROOLED Maryland Display) having the following characteristics: resolution: 850×500 (WVGA); viewing area: 8.7×5.0 mm (10 mm diag.); luminance: 300 cd/m$^2$; and power consumption: 25 mW. With reference to FIG. 4, the optical system is designed to create a virtual image approximately 10 meters to the right of the primary mirror. This is done because the eye can easily focus on a distant object, whereas it struggles with very close objects. It is also used to distinguish visual space analysis from display space analysis discussed more fully below.

Table 1 lists the relevant top level parameters of system 100-1.

TABLE 1

| Parameter | Value |
| --- | --- |
| Full Field of View (diag.) | 24.25° |
| Entrance Pupil Diameter or Eyebox (as used) | 5 mm |
| Working f/# | 4.56 |
| Effective Focal Length | 22.8 mm |

Table 2 shows the angles at which the mirrors 101, 102 and image source 109 are tilted, as well as the distances from the eyebox to the closest structure and to the primary mirror 101. The mirrors are tilted so the path of the light is bent into a configuration such that the mirrors/image source are not obstructing the light internal to the system.

TABLE 2

| Element Tilts | Angle | Reference |
| --- | --- | --- |
| Primary Mirror | −20° | Global Y-axis |
| Secondary Mirror | −16° | Axis defined by primary |
| Microdisplay | 17.79° | Axis defined by secondary |

| Distances | Value |
| --- | --- |
| Eyebox to closest structure | 6 mm |
| Eyebox to Primary Mirror | 25 mm |

Figure 2:
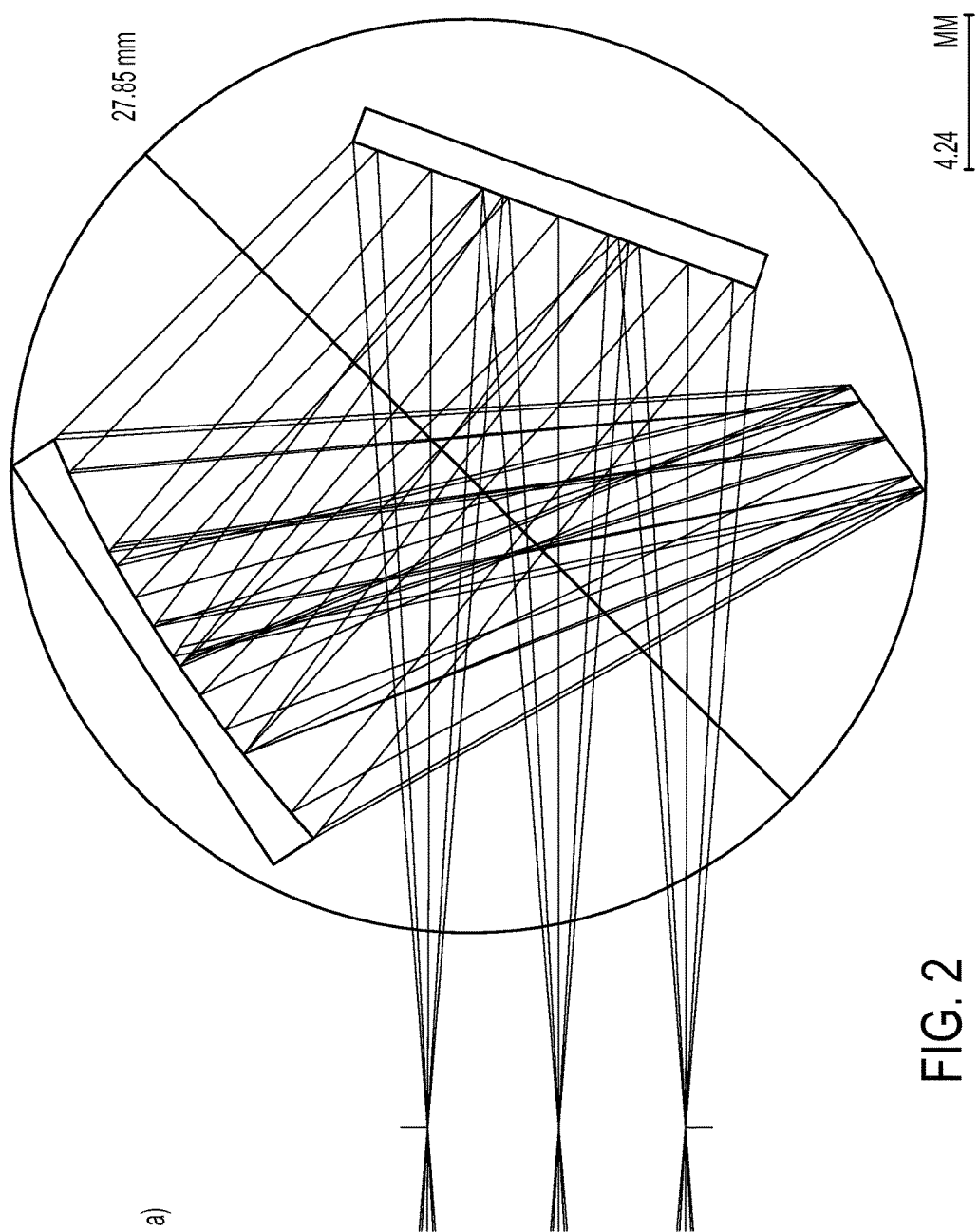
FIG. 2 is a two-dimensionally ray trace of a two-mirror HWD fitted within a spherical volume with a diameter of 27.85 mm, according to an illustrative aspect of the invention.
Figure 3:
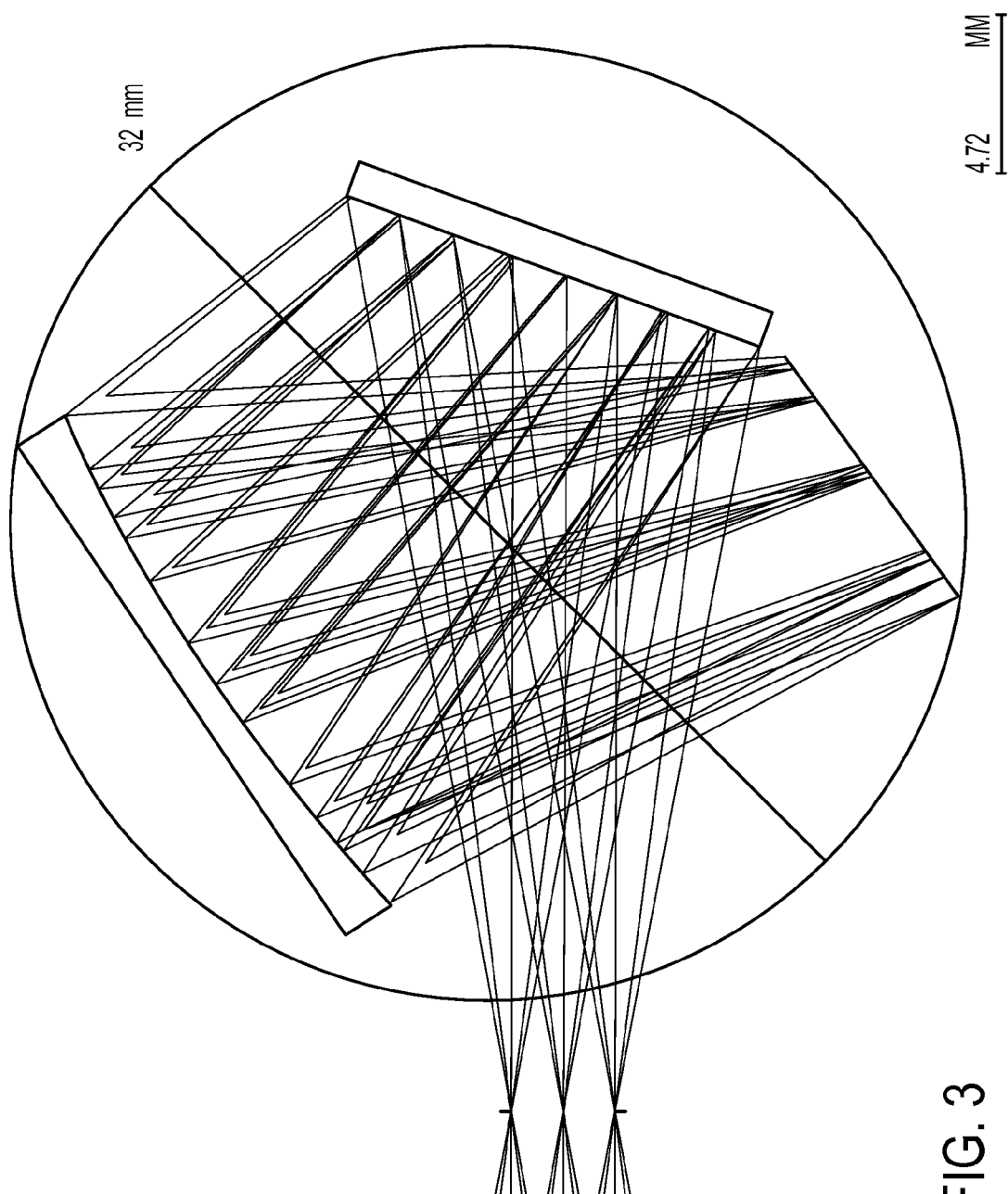
FIG. 3 is a two-dimensionally ray trace of a two-mirror HWD fitted within a spherical volume with a diameter of 32 mm, according to an illustrative aspect of the invention.

FIGS. 2 and 3, respectively, show a two-mirror HWD fitted within a spherical volume with a diameter of 27.85 mm and 32 mm. The small geometry greatly limits the amount of variation possible of the tilts of the mirrors.

Figure 5:
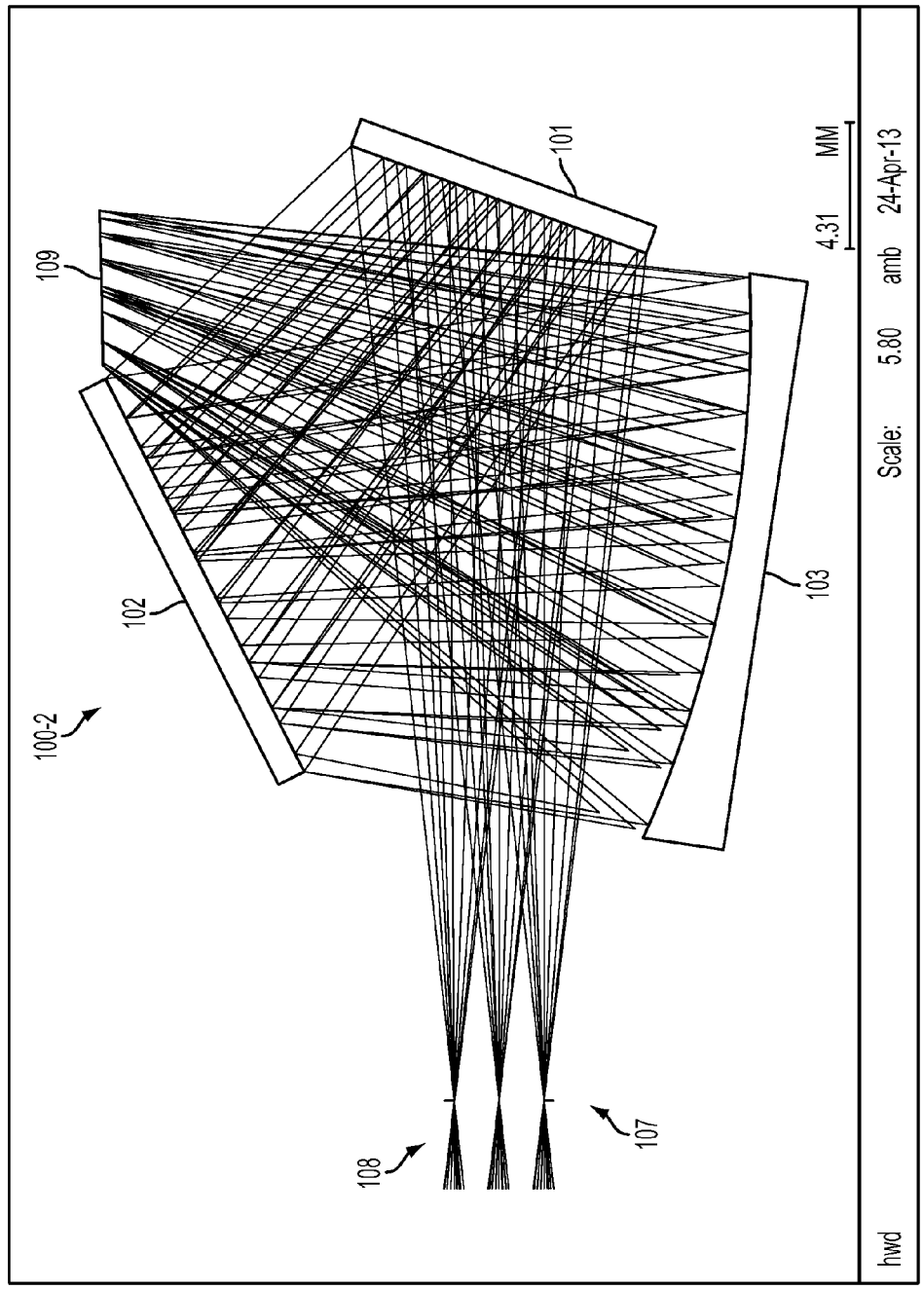
FIG. 5 shows a two-dimensional ray trace of a three-mirror see-through optical display apparatus/system according to an illustrative embodiment of the invention.
Figure 6:
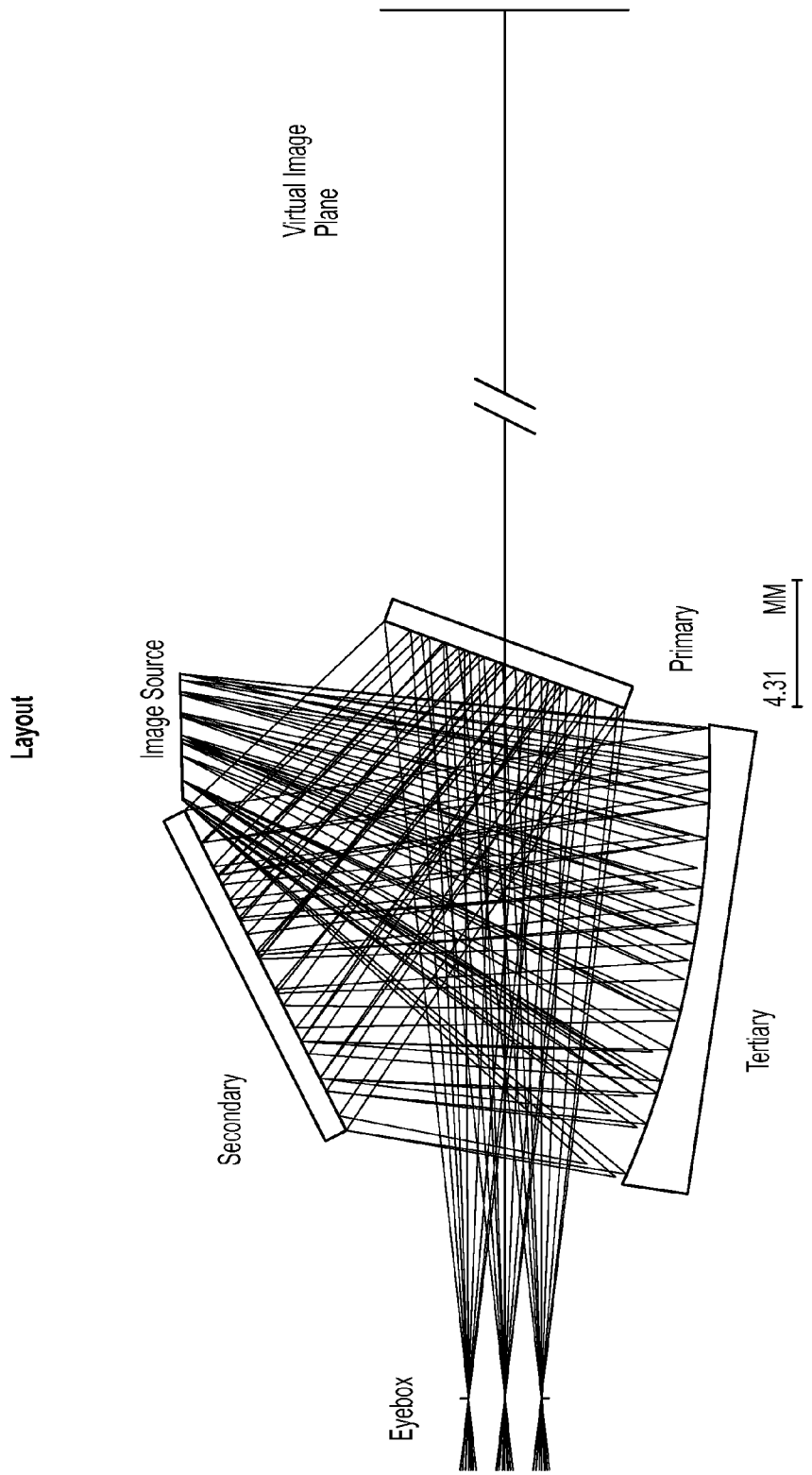
FIG. 6 shows the two-dimensional ray trace of the three-mirror see-through optical display apparatus/system of FIG. 5, but with the addition of the virtual image plane located ~10 meters in front of the system, at a location at which the eye can focus, according to an illustrative aspect of the invention.

FIG. 5 shows a two-dimensional ray trace of a three-mirror see-through optical display apparatus/system 100-2 consisting of a primary mirror 101, a concave secondary mirror 102, a concave tertiary mirror 103, and an image generating component 109, and having an external aperture stop 107 located at the eyebox 108. In this exemplary design, the primary mirror 101 is a simple plane mirror that is coated to be partially reflective and partially transmissive (80%-50% Reflective and 20%-50% Transmissive); the secondary mirror 102 has a 100% reflective, concave, freeform surface; and the tertiary mirror 103 has a 100% reflective, concave, freeform surface. With reference to FIG. 6 and similarly to FIG. 4, the optical system 100-2 is designed to create a virtual image approximately 10 meters to the right of the primary mirror.

Table 3 lists the relevant top level parameters of system 100-2.

TABLE 3

| Parameter | Value |
| --- | --- |
| Full Field of View (diag.) | 24.25° |
| Entrance Pupil Diameter or Eyebox (as used) | 3 mm |
| Working f/# | 7.6 |
| Effective Focal Length | 22.8 mm |

Table 4 shows the angles at which the mirrors 101, 102, 103, and image source 109 are tilted, as well as the distances from the eyebox to the closest structure and to the primary mirror 101. The mirrors are tilted so the path of the light is bent into a configuration such that the mirrors/image source are not obstructing the light internal to the system. A benefit of this system is the extended eye relief ("eye relief" meaning the distance from the position of the eye to the nearest structure of the optical system).

TABLE 4

| Element Tilts | Angle | Reference |
| --- | --- | --- |
| Primary Mirror | −20° | Global Y-axis |
| Secondary Mirror | −23° | Axis defined by primary |
| Tertiary Mirror | −12 | Axis defined by secondary |
| Microdisplay | 21.72° | Axis defined by tertiary |

| Distances | Value |
| --- | --- |
| Eyebox to closest structure | 9.16 mm |
| Eyebox to Primary Mirror | 31 mm |

Figure 7:
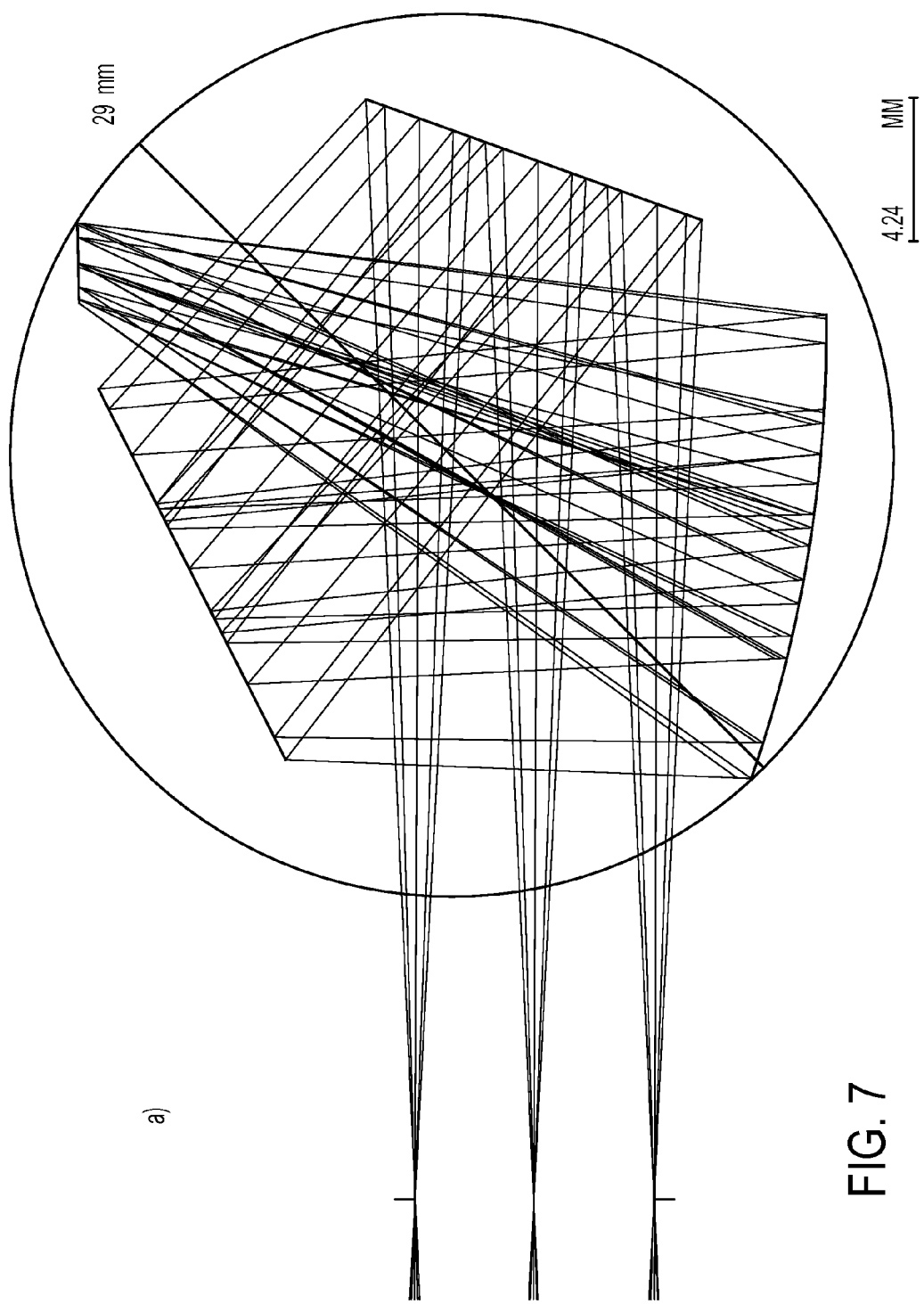
FIG. 7 is a two-dimensionally ray trace of a three-mirror HWD fitted within a spherical volume with a diameter of 29 mm, according to an illustrative aspect of the invention.
Figure 8:
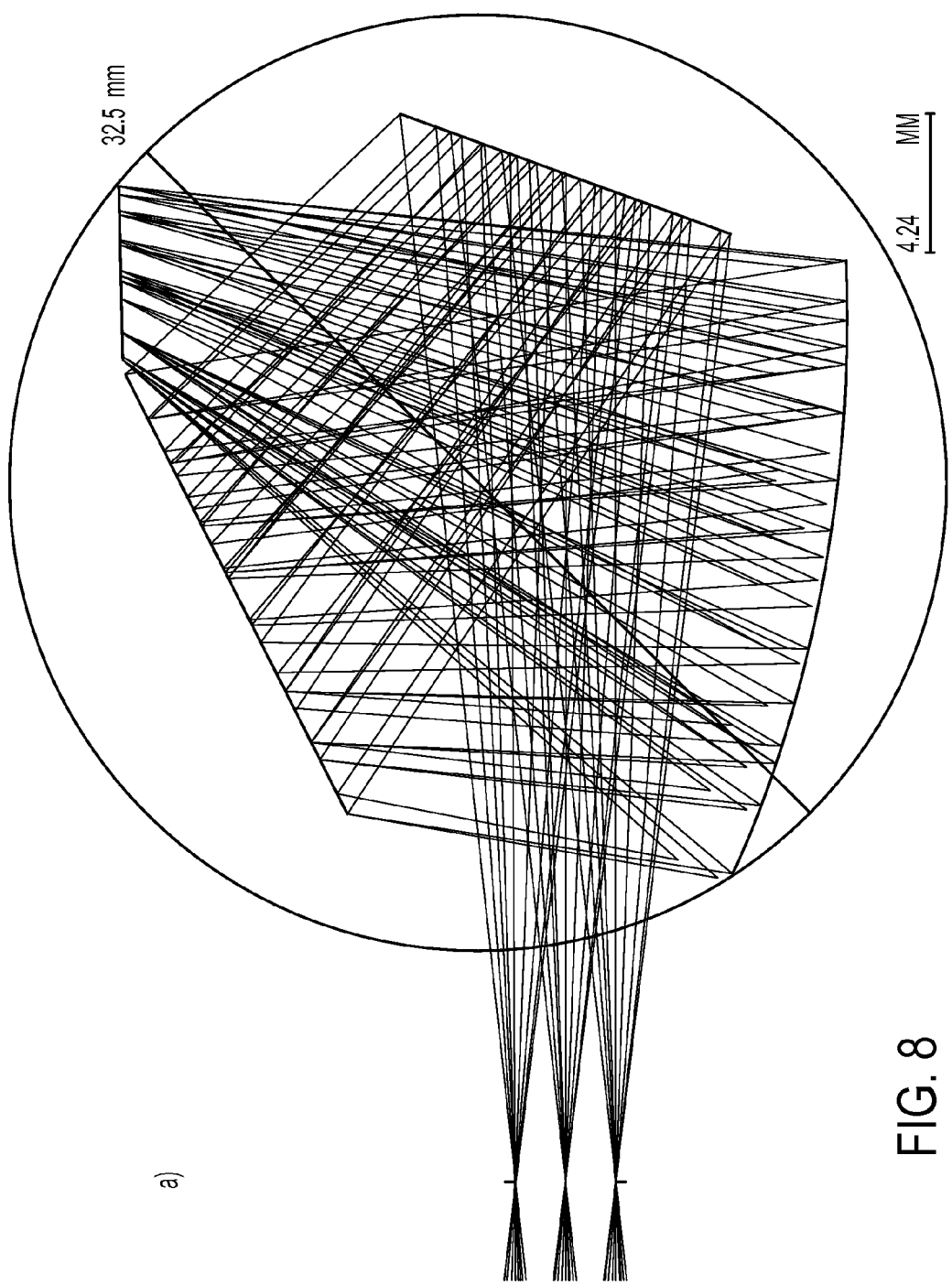
FIG. 8 is a two-dimensionally ray trace of a three-mirror HWD fitted within a spherical volume with a diameter of 32.5 mm, according to an illustrative aspect of the invention.

FIGS. 7 and 8, respectively, show a three-mirror HWD fitted within a spherical volume with a diameter of 29 mm and 32.5 mm. The small geometry greatly limits the amount of variation possible of the tilts of the mirrors.

In both the two-mirror and the three-mirror designs, the mirrors have been constrained to be concave to minimize the package size. Convex mirrors diverge light, requiring larger subsequent mirror apertures and, thus, a larger package size as a whole. It is also advantageous to minimize the tilts of all of the mirrors to minimize the induced astigmatism and coma. This will reduce the overall amount of correction the mirrors need to provide, decreasing the amount of freeform departure.

Figure 9:
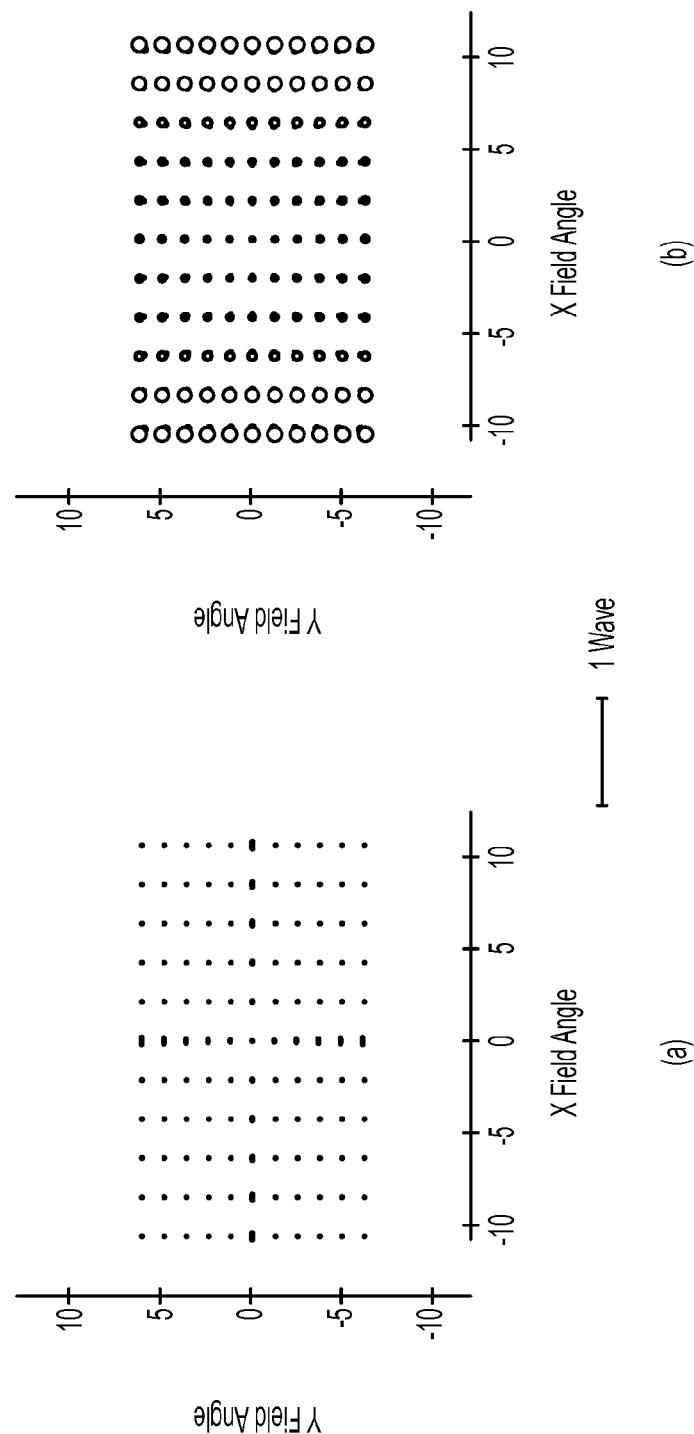
FIG. 9: a) Astigmatism and b) coma contributions across the full FOV for an obscured rotationally symmetric system. Coma is the dominant aberration with only about λ/5 P-V.
Figure 10:
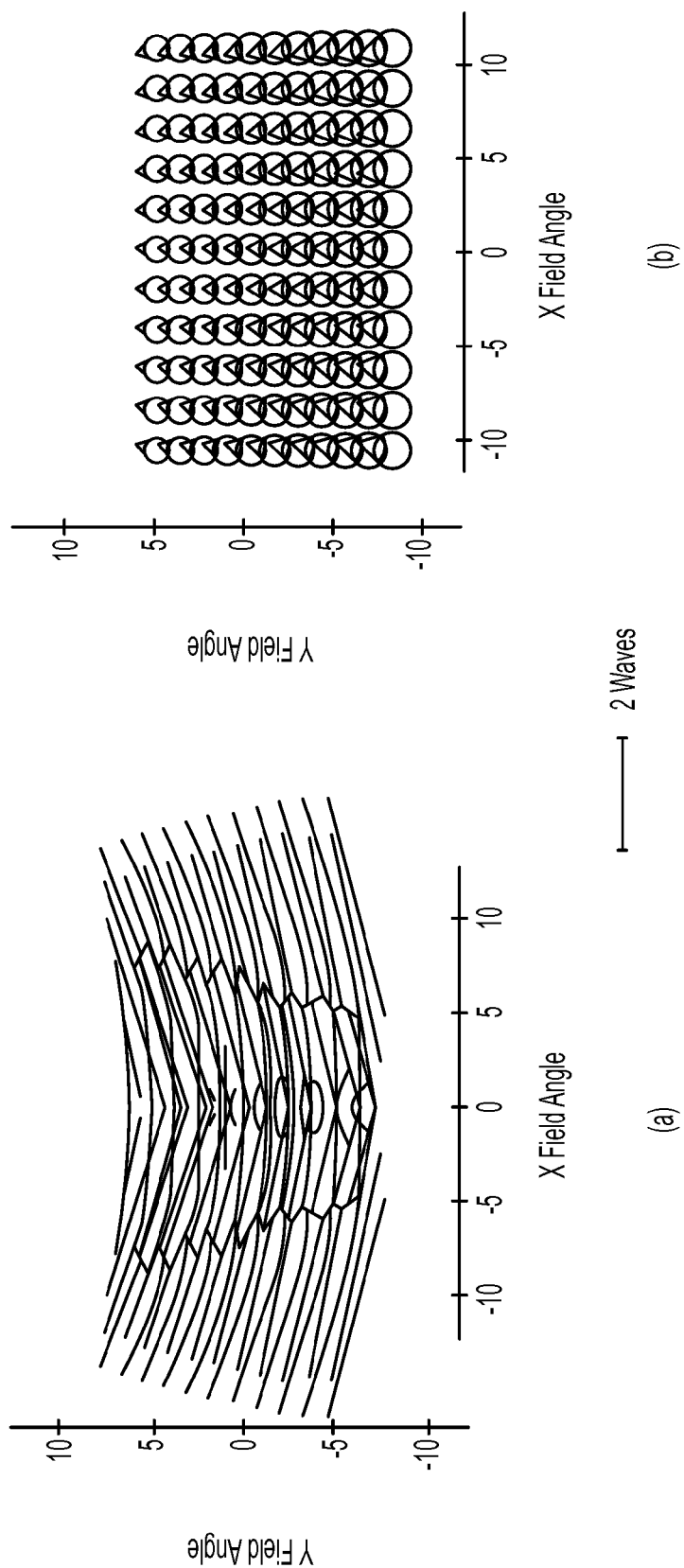
FIG. 10: a) Astigmatism and b) coma contributions across the full FOV after tilting the surfaces to form an unobscured, non-rotationally symmetric system. Tilting the surfaces has resulted in significant amounts of nearly field-constant coma and, the now dominant, astigmatism with approximately 4 waves.

Without regard to a two-mirror or a three-mirror system, the starting designs were all-spherical designs folded into each final, unobscured geometry. To illustrate the deleterious effect that tilting the mirrors has on the astigmatism and coma, FIG. 9 and FIG. 10 show the astigmatism and coma contributions across the full FOV for an obscured rotationally symmetric system and an unobscured, tilted system, respectively. This behavior can be thought of, in a nodal aberration theory sense, as the node(s) moving far outside the field of view as the system is made non-symmetric. The relatively small coma and astigmatism contributions are increased by an order of magnitude as a result of tilting the mirrors. The mirror tilts for each system were optimized to minimize aberrations while still maintaining an unobscured geometry using ray clearance constraints.

Figure 11:
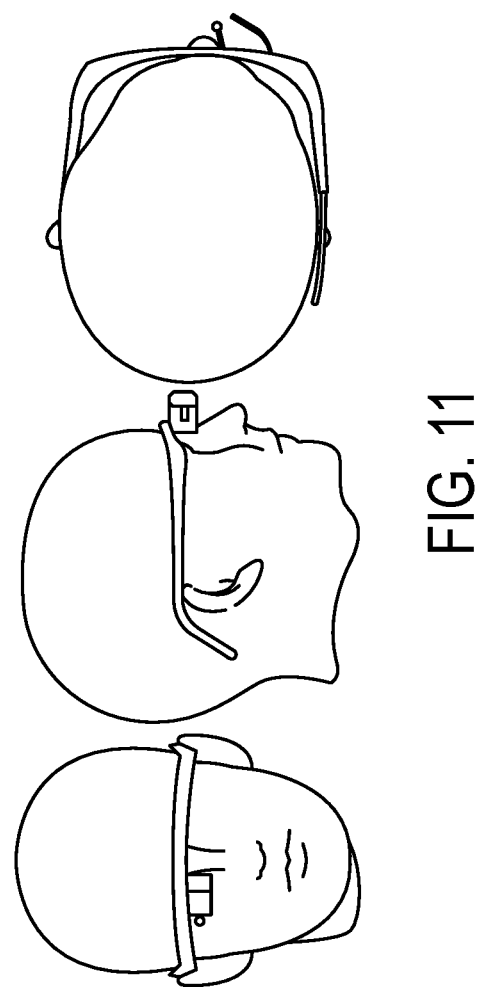
FIG. 11 is a 3D rendering of a two-mirror HWD mounted on a model of a human head in a monocular fashion to depict the relative scale of the system, according to an illustrative embodiment of the invention.

The sag, z(x,y), of the freeform surfaces in each design is defined mathematically by the following equation, $$z(x, y) = \frac{c\rho^2}{1 + \sqrt{1 - (1+k)c^2\rho^2}} + \sum_{j=1}^{16} C_j Z_j$$

where c is the curvature of the base sphere, k is the conic constant, $\rho$ is the radial coordinate of the surface, $C_j$ is weight factor on the $j^{th}$ Zernike term, $Z_j$. The first term is a base conic (a sphere being a special case), upon which the second term, a weighted sum of Zernike polynomials, is overlaid. A consequence of having an external stop in an optical system that is significantly displaced from the first surface is that the object fields may be thought to "walk" about the surfaces, meaning that each field point experiences a different portion of the surface. Each field receives a different contribution to its net aberration field from a surface depending on its location with respect to the vertex of the surface and the surface shape. The type of aberration correction is proportional to the pupil derivatives of the surface description. For example, if the surface is purely comatic, the resulting aberration correction would be astigmatic as well as other aberrations with lower-order pupil dependence. As a result of the external stop, the system cannot easily correct for field-constant aberrations. However, we can still correct the residual field-dependent aberrations and quantify that a high performance system can still be designed. The final specifications for each exemplary design are reported in TABLE 5. FIG. 11 is a 3D rendering of a two-mirror design mounted on a model of a human head in a monocular fashion to depict the relative scale of the system. A binocular embodiment could also be realized as one skilled in the art would appreciate.

Figure 12:
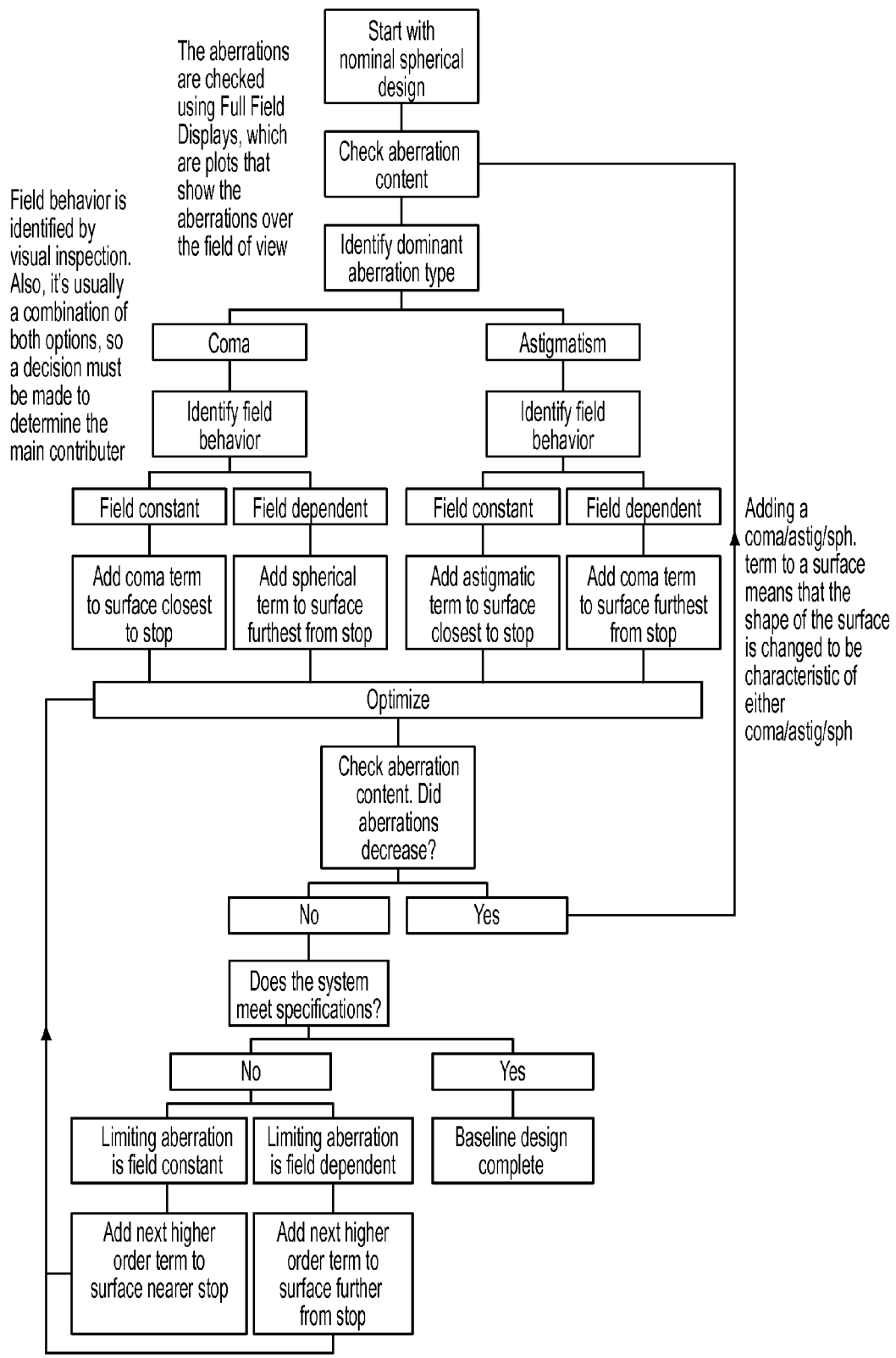
FIG. 12 is a flow chart showing the steps of a method for designing/making a see-through optical display apparatus, according to an illustrative embodiment of the invention.

FIG. 12 is a flow chart showing the steps of a method for designing/making a see-through optical display apparatus, according to an illustrative embodiment of the invention. The method includes the steps of: a) determining an apparatus specification; b) selecting a field of view and an aperture stop size for the apparatus; c) positioning the aperture stop at an entrance pupil of an observing optical system; d) designing a rotationally symmetric, spherical optical system; e) determining the aberration content of the apparatus over the full field of view; f) identifying a dominant aberration comprising one of coma and astigmatism, and i) if coma: determining whether the coma is more field constant or more field dependent, and if more field constant: adding a coma term to the optical surface nearest to the aperture stop, or if more field dependent: adding a spherical aberration term to the optical surface furthest from the aperture stop; or ii) if astigmatism: determining whether the astigmatism is more field constant or more field dependent, and if more field constant: adding an astigmatism term to the optical surface nearest to the aperture stop, or if more field dependent: adding a coma term to the optical surface furthest from the aperture stop; g) optimizing the optical system design; h) determining whether the aberration content of the optimized design decreased, and iii) if no: determining whether the apparatus meets the determined specification, and if yes: design is complete, or if no: determining whether the limiting aberration is more field constant or more field dependent, and if more field constant: adding the next higher-order aberration term to the surface nearest to the aperture stop, or if more field dependent: adding the next higher-order aberration term to the surface furthest from the aperture stop; i) repeating steps (g) through (h); or iv) if yes: repeating steps (e) through (h).

Display Space Analysis

Figure 13:
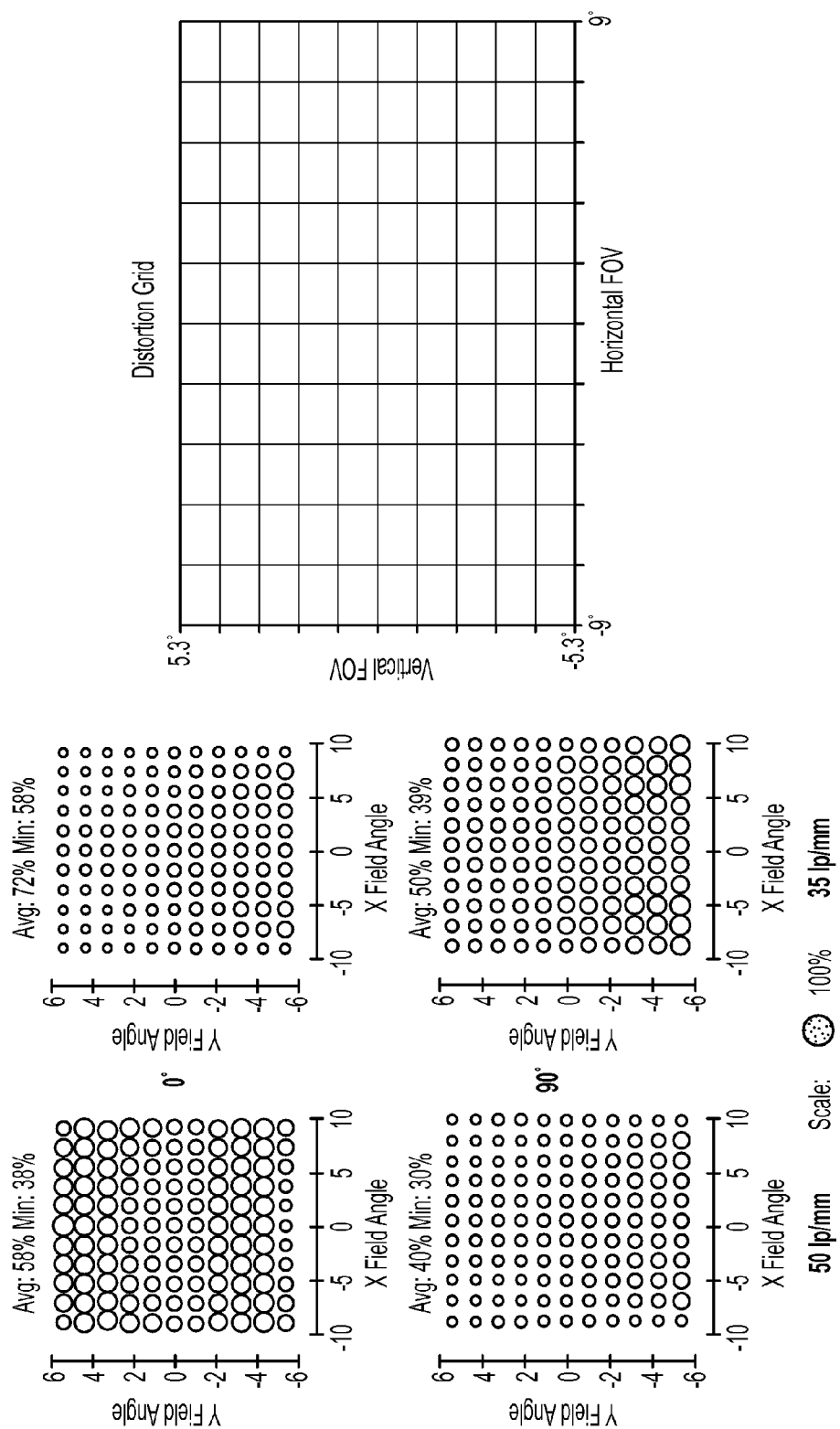
FIG. 13: Three mirror HWD performance analysis. Left: MTF FFDs shown for two object orientations (0° and 90°) and two frequencies (50 lp/mm and 35 lp/mm); Right: Distortion grid showing <1.5% distortion.
Figure 14:
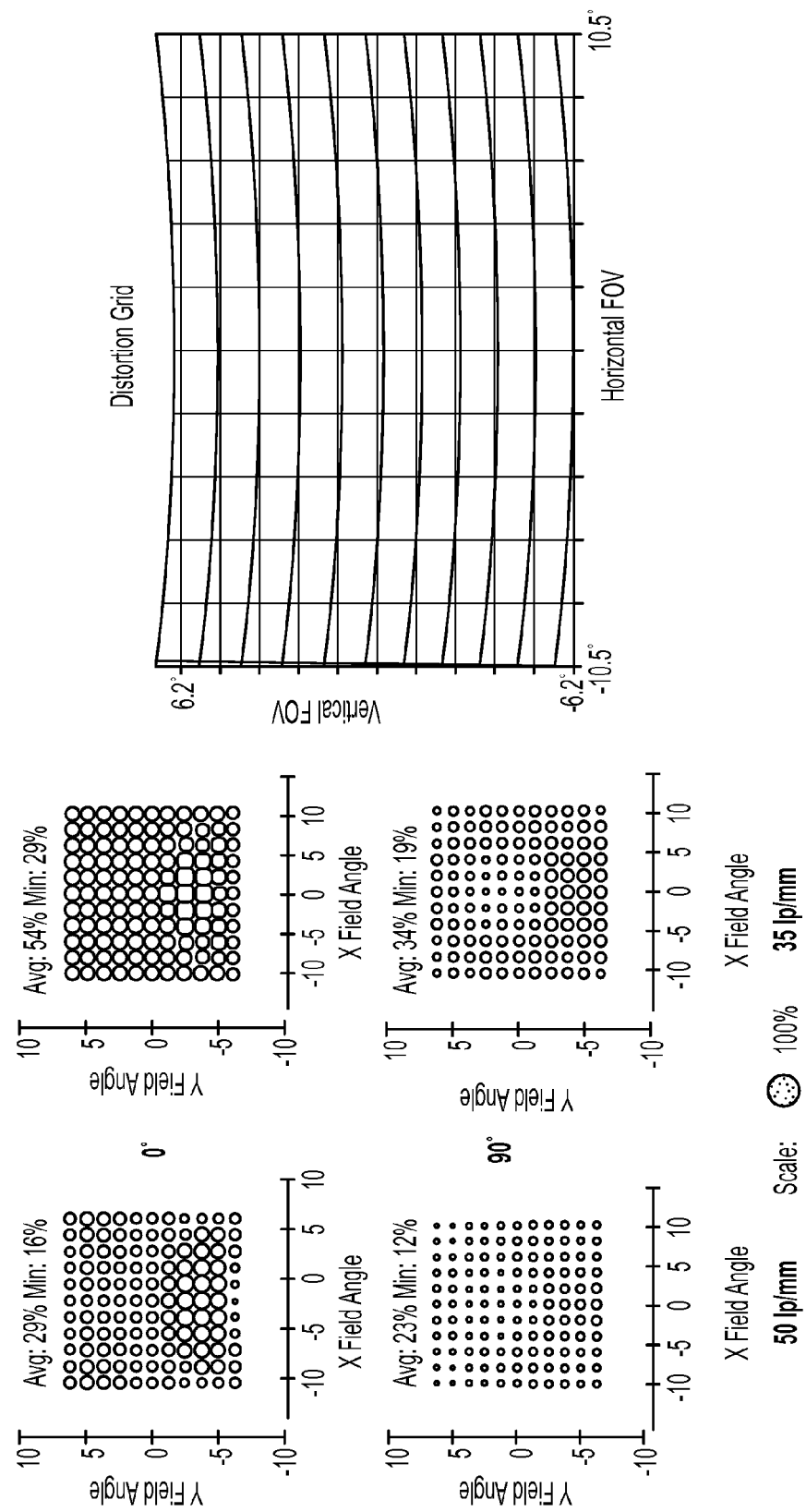
FIG. 14: Two mirror HWD performance analysis. Left: MTF FFDs shown for two object orientations (0° and 90°) and two frequencies (50 lp/mm and 35 lp/mm). Right: Distortion grid showing <6.2% distortion.

We evaluated the performance of the (two-mirror and three-mirror) systems by calculating the modulation transfer function (MTF) over the full FOV at 100% and 75% of the Nyquist frequency of the OLED microdisplay (Model: MICROOLED Maryland). FIG. 13 and FIG. 14 show the MTF results for the three-mirror system 100-2 and for the two-mirror system 100-1 respectively. We used the so called full-field displays because freeform surface optimization techniques often lead to excellent performance at the field points for which the system was optimized, but unsatisfactory performance for those field points in-between. We also calculated the distortion of each HWD using a distortion grid evaluation, also shown in FIG. 13 and FIG. 14 for the three mirror and two mirror systems, respectively. While the distortion is small (<6.2%), real-time correction of off-axis distortion may be implemented to completely correct the residual distortion.

Visual Space Analysis

Figure 15:
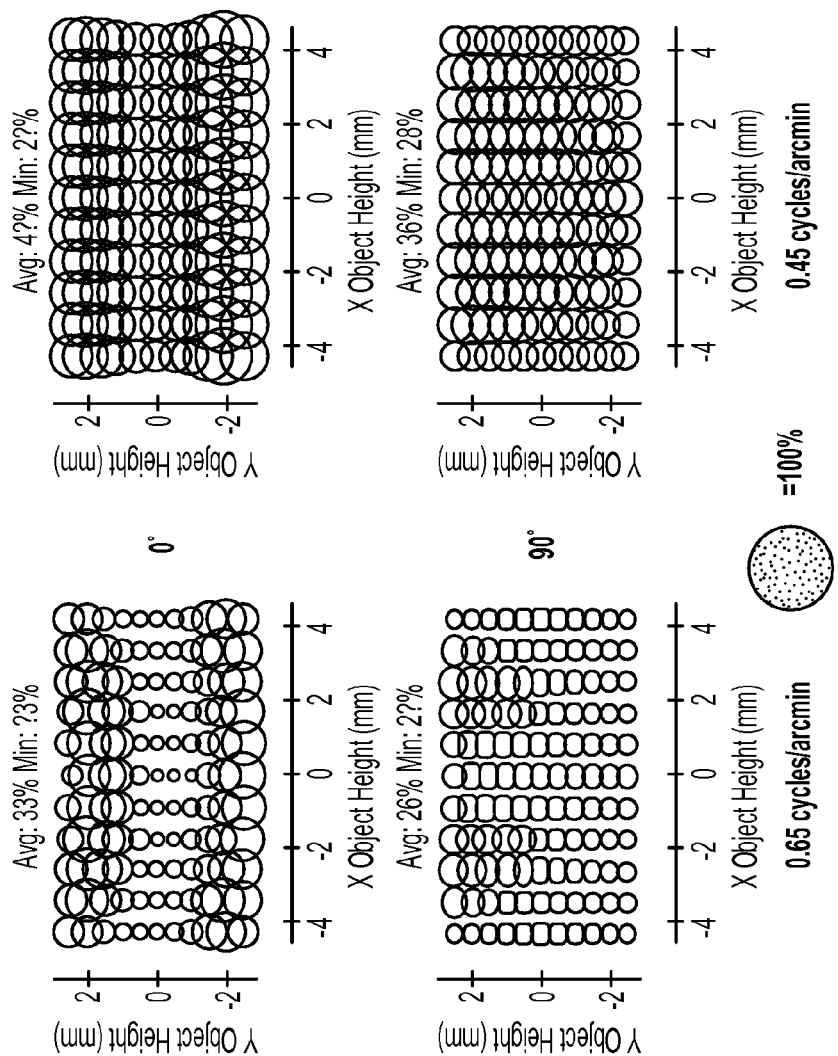
FIG. 15: FFD MTF plots in visual space for (a) Three mirror HWD and (b) Two Mirror HWD. The top and bottom rows represent object orientations of 0° and 90°, respectively. Plots are shown for 0.65 cycles/arcmin (the maximum resolution based on the OLED) and 0.45 cycles/arcmin (70% of the maximum resolution).
Figure 15:
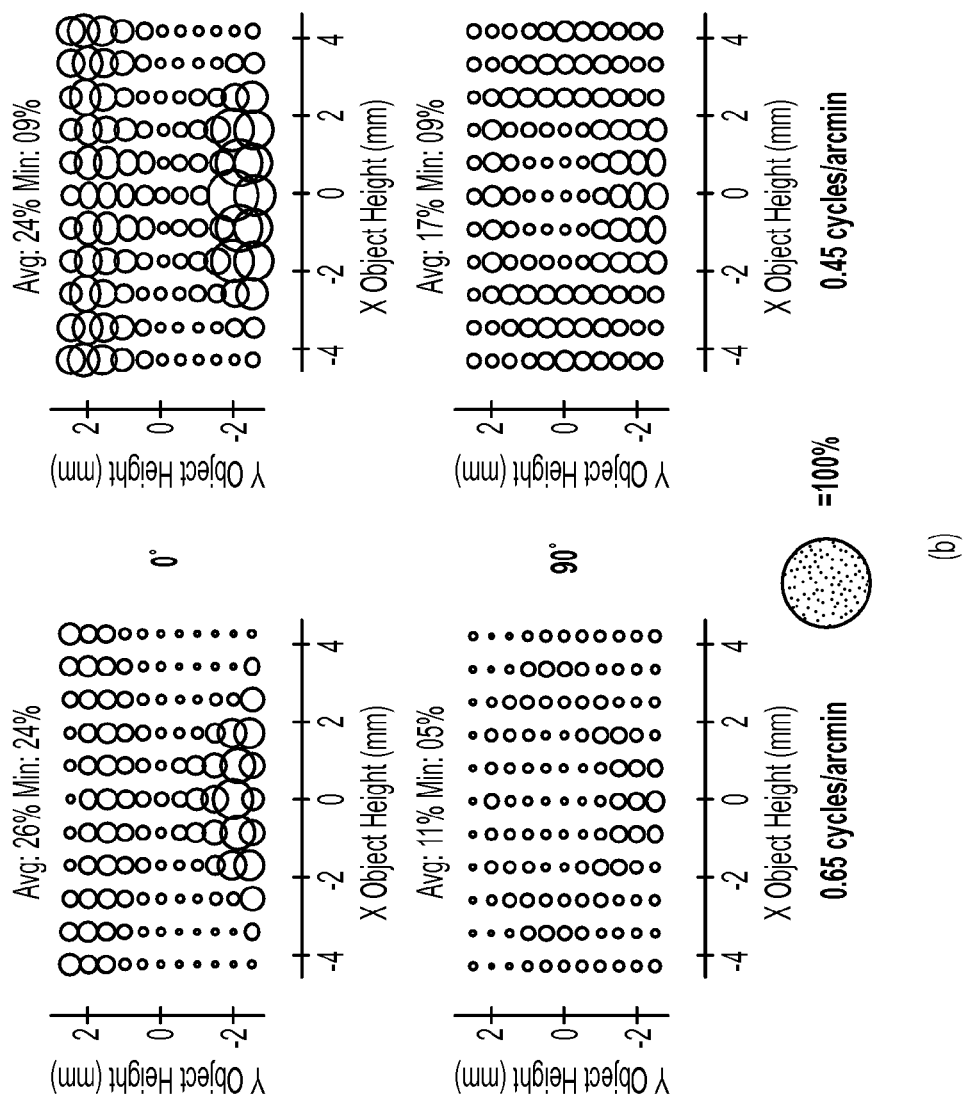

While the display space analysis can give the designer a quick glimpse into the overall performance of the optical system, it cannot accurately predict how the system will perform when it is used as intended. There are, however, methods that can. In ray trace software, the analyses are typically done in the same configuration as the system is designed, but visual systems, including the HWDs disclosed herein, are designed such that the OLED microdisplay is in image space, so one cannot immediately analyze what the eye will "see." The solution is to flip the system. After flipping the optical system, image space is now the same space in which the eye is located; therefore, any analysis completed will be in visual space. In visual space, we choose to work in units of angle because the image plane is infinitely far away. The human eye can resolve roughly 1 cycle/arcminute on-axis where the photoreceptors are most densely packed (rods only) and degrades significantly off-axis due to a lower density of photoreceptors (rods and cones). This represents a maximum useful resolution for any design and analysis done in visual space. Systems with resolution greater than 1 arcmin may be considered as overdesigned for the visual system. The disclosed systems, however, are limited by the OLED microdisplay and its pixel pitch of 10 microns. Dividing the FFOV by the pixel array size in the horizontal direction gives an idea of how close the system comes to being eye-limited. The three mirror HWD and the two mirror HWD have a maximum visual resolution of 1.5 arcmin/pixel. We evaluated the visual space MTF of both systems out to a frequency of 0.65 cycles/arcmin, which is an equivalent measurement of the maximum visual resolution of the system. FIG. 15 shows the visual MTF plots for the three mirror HWD and the two mirror HWD.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both"

of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

We claim:

1. A see-through optical head-worn display (HWD) apparatus, comprising:
   an image generating component;
   a tilted primary mirror having a non-flat, freeform, front optical surface; and
   a tilted secondary mirror having a non-flat, freeform, front optical surface,
   wherein the apparatus has an external pupil, and wherein the non-flat, freeform, front optical surfaces of the tilted primary mirror and the tilted secondary mirror have concave curvatures.

2. The apparatus of claim 1, wherein the external pupil is an aperture stop located at the entrance pupil of an observer viewing the image.

3. The apparatus of claim 1, wherein the image generating component is an OLED microdisplay.

4. The apparatus of claim 1, wherein at least one of the mirrors' surfaces has a photochromic or an electrochromic coating.

5. The apparatus of claim 1, wherein the primary mirror and the secondary mirror form a two-mirror optical system, and
   wherein the primary mirror is a semi-transparent/semi-reflective optical component, and the secondary mirror has a 100% reflective freeform front optical surface.

6. The apparatus of claim 5, wherein at least one of the mirrors' surfaces has a photochromic or an electrochromic coating.

7. The apparatus of claim 5, wherein the primary mirror has a non-flat, freeform, rear optical surface.

8. The apparatus of claim 1, further comprising a flat surface, semi-transparent/semi-reflective optical component.

9. The apparatus of claim 5, wherein the image generating component, primary mirror, and secondary mirror are fitted within a spherical volume having a radius that is equal to or less than 14 millimeters (mm).

10. The apparatus of claim 1, characterized by a field of view (FOV) between 20-30 degrees.

11. The apparatus of claim 1, further comprising an eyeglass frame to which the image generating component, the primary mirror, and the secondary mirror are coupled.

12. The apparatus of claim 1, further comprising a head-wearable structure to which the image generating component, the primary mirror, and the secondary mirror are coupled.

13. A method for designing and making a see-through optical head-worn display (HWD) apparatus of claim 1 for displaying an image generated by or on an image generating component of the apparatus, comprising:
   a) determining an apparatus specification;
   b) selecting a field of view and an aperture stop size for the apparatus;
   c) positioning the aperture stop at an entrance pupil of an observing optical system;
   d) designing a rotationally symmetric, spherical optical system;
   e) determining an aberration content of the apparatus over the full field of view;
   f) identifying a dominant aberration comprising one of coma and astigmatism, and
      i) if coma: determining whether the coma is more field constant or more field dependent, and if more field constant: adding a coma term to the optical surface nearest to the aperture stop, or
if more field dependent: adding a spherical aberration term to the optical surface furthest from the aperture stop; or
ii) if astigmatism: determining whether the astigmatism is more field constant or more field dependent, and
if more field constant: adding an astigmatism term to the optical surface nearest to the aperture stop, or
if more field dependent: adding a coma term to the optical surface furthest from the aperture stop;
g) optimizing the optical system design;
h) determining whether the aberration content of the optimized design decreased, and
iii) if no: determining whether the apparatus meets the determined specification, and
if yes: design is complete, or
if no: determining whether the limiting aberration is more field constant or more field dependent, and
if more field constant: adding the next higher-order aberration term to the surface nearest to the aperture stop, or
if more field dependent: adding the next higher-order aberration term to the surface furthest from the aperture stop;
i) repeating steps (g) through (h); or
iv) if yes: repeating steps (e) through (h).

14. A see-through optical head-worn display (HWD) apparatus, comprising:
an image generating component;
a tilted tertiary mirror having a non-flat, freeform, front optical surface;
a tilted secondary mirror having a non-flat, freeform, front optical surface;
a primary mirror comprising a flat surface, semi-transparent/semi-reflective optical component; and
an external pupil;
wherein the primary mirror, the secondary mirror, and the tertiary mirror form a three-mirror optical system;
wherein the non-flat, freeform, front optical surfaces of the tertiary mirror and the secondary mirror have concave curvatures and
wherein the secondary mirror and the tertiary mirror have 100% reflective freeform front optical surfaces.

15. The apparatus of claim 14, wherein at least one of surfaces of the primary mirror, the secondary mirror, or the tertiary mirror has a photochromic or an electrochromic coating.

16. The apparatus of claim 14, wherein the image generating component, primary mirror, secondary mirror and tertiary mirror are fitted within a spherical volume having a diameter that is equal to or less than 32.5 millimeters (mm).

* * * * *